United States Patent [19]

Morita et al.

[11] Patent Number: 4,733,728

[45] Date of Patent: Mar. 29, 1988

[54] MICELLAR SLUG FOR OIL RECOVERY

[75] Inventors: Hiroshi Morita, Chiba; Yasuyuki Kawada, Odawara; Junichi Yamada; Toshiyuki Ukigai, both of Chiba, all of Japan

[73] Assignee: Lion Corporation, Tokyo, Japan

[21] Appl. No.: 798,786

[22] Filed: Nov. 18, 1985

[30] Foreign Application Priority Data

Dec. 6, 1984 [JP] Japan .................. 59-256450

[51] Int. Cl.$^4$ ............................................. E21B 43/22
[52] U.S. Cl. .................................... 166/274; 166/275; 252/8.554
[58] Field of Search .................. 252/8.55 D, 8.554; 166/274, 275

[56] References Cited

U.S. PATENT DOCUMENTS

| | | | |
|---|---|---|---|
| 3,506,070 | 4/1970 | Jones ........................ | 252/312 X |
| 3,808,156 | 4/1974 | Gorsich et al. ............. | 252/545 |
| 3,977,471 | 8/1976 | Gale et al. .................. | 252/8.554 |
| 4,110,229 | 8/1978 | Carlin et al. ................ | 252/8.554 |
| 4,293,428 | 10/1981 | Gale et al. .................. | 252/8.554 |
| 4,507,223 | 3/1985 | Tano et al. .................. | 252/353 |
| 4,532,053 | 7/1985 | Morita et al. ............... | 252/8.554 |
| 4,555,351 | 11/1985 | Morita et al. ............... | 252/8.554 |
| 4,556,108 | 12/1985 | Morita et al. ............... | 252/8.554 X |

Primary Examiner—Herbert B. Guynn
Attorney, Agent, or Firm—Armstrong, Nikaido, Marmelstein & Kubovcik

[57] ABSTRACT

A micellar slug for use in the recovery of oil, consisting essentially of a surfactant and an aqueous medium, which may contain an inorganic salt. The surfactant contains, as essential constituents, (a) at least one internal olefin sulfonate having 10 to 26 carbon atoms; and
(b) 0.1 to 60 parts by weight, based on 100 parts by weight of the internal olefin sulfonate, of at least one ether sulfonate having the general formula:

$$R^1-O-(R^2O)_m-(R^3O)_n-R^4-SO_3X \qquad (I)$$

wherein $R^1$ represents an alkyl or alkenyl phenyl group having 12 to 26 carbon atoms or an alkyl or alkenyl group having 10 to 24 carbon atoms, $R^2$ represents $C_2H_4$ or $C_3H_6$, $R^3$ represents $C_2H_4$ or $C_3H_6$, $R^4$ represents $C_2H_4$, $C_3H_6$, or $CH_2CH(OH)CH_2$, $n \geq 0$, $m \geq 0$, and $n+m=0$ to 15, and X represents an alkali metal or an alkaline earth metal.

4 Claims, 1 Drawing Figure

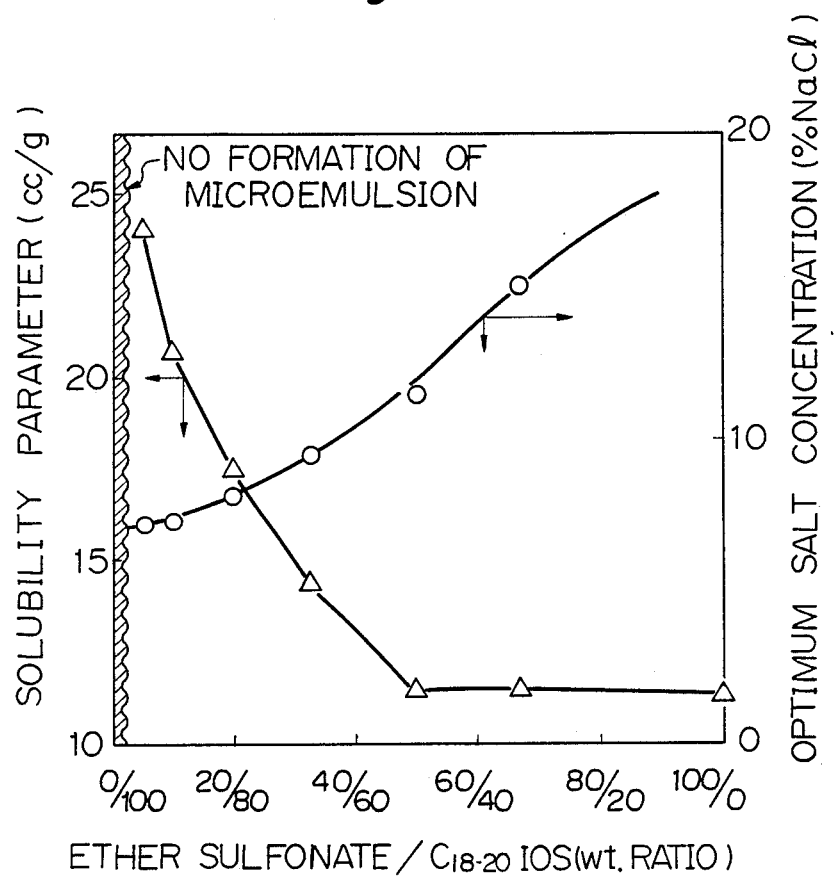

MICELLAR SLUG FOR OIL RECOVERY

BACKGROUND OF THE INVENTION

1. Field of the Invention

The present invention relates to a micellar slug suitable for use in a micellar drive for recovering oil (i.e., petroleum) from subterranean reservoirs. More specifically, it relates to a micellar slug having large intake amounts of oil and brine in the resultant micro-emulsions and a good dilution stability of the micro-emulsion, capable of recovering oil from subterranean reservoirs having a high salt content at a high oil recovery efficiency.

2. Description of the Prior Art

Micellar drive is known in the art as one of the so-called "enhanced oil recovery (EOR)" methods for recovering oil from oil-bearing subterranean reservoirs. According to the known micellar drive methods, microemulsions comprising water, oil, surfactants, and cosurfactants are injected under pressure into the subterranean reservoirs, or aqueous solutions of water, surfactants, and cosurfactants are injected into the subterranean reservoirs to form micro-emulsions therein, for the recovery of oil remaining in the subterranean reservoirs. Various processes and chemicals have been heretofore studied in the art. The micellar drive methods and chemicals are disclosed in, for example, U.S. Pat. Nos. 3,506,070, 3,990,515, 4,017,405, 4,018,278, 4,059,154, and 4,066,124. These prior arts disclose various kinds of anionic, cationic, and nonionic surfactants as surfactants suitable for use in the micellar drive methods and also disclose various kinds of lower alcohols as cosurfactants suitable for use in the micellar drive methods.

However, the micellar drive methods utilizing surfactants and lower alcohols are disadvantageous in that, since the partition coefficients of the surfactants and the lower alcohols to oil and water are different, the desired high oil recovery capability of the microemulsions cannot be maintained in the subterranean reservoirs due to the dilution thereof with oil and water, and the formation of the micro-emulsions having large intake amounts of oil and water is difficult.

SUMMARY OF THE INVENTION

The objects of the present invention are to eliminate the above-mentioned disadvantages in the conventional micellar drive methods and to provide, for the recovery of oil from subterranean reservoirs of a high oil recovery efficiency, a micellar slug having good dilution stability of the oil recovery capability of the micro-emulsion formed therefrom and large intake amounts of oil and brine in the micro-emulsion formed therefrom.

Other objects and advantages of the present invention will be apparent from the following description.

In accordance with the present invention, there is provided a micellar slug, for use in the recovery of oil, consisting essentially of a surfactant and an aqueous medium, which may contain an inorganic salt. The surfactant contains, as essential constituents, (a) at least one internal olefin sulfonate having 10 to 26 carbon atoms; and
(b) 0.1 to 100 parts by weight, based on 100 parts by weight of said internal olefin sulfonate, of at least one ether sulfonate having the general formula:

$$R^1\text{-O-}(R^2O)_m\text{-}(R^3O)_n\text{-}R^4\text{-SO}_3X \qquad (I)$$

wherein $R^1$ represents an alkyl or alkenyl phenyl group having 12 to 26 carbon atoms or an alkyl or alkenyl group having 10 to 24 carbon atoms, $R^2$ represents $C_2H_4$ or $C_3H_6$, $R^3$ represents $C_2H_4$ or $C_3H_6$, $R^4$ represent $C_2H_4$, $C_3H_6$, or $CH_2CH(OH)CH_2$, $n \geq 0$, $m \geq 0$, and $n+m=0$ to 15, preferably $n=0$ to 10, $m=0$ to 10 and $n+m=1$ to 10, and X represents an alkali metal or an alkaline earth metal.

BRIEF DESCRIPTION OF THE DRAWING

The present invention will be better understood from the description set forth below with reference to the accompanying drawing, in which correlations between the mixing ratio of the surfactants (i.e., the ether sulfonate and the internal olefin sulfonate) and the solubilization parameter and the optimum salinity obtained in Example 2 are graphically shown.

DESCRIPTION OF THE PREFERRED EMBODIMENTS

The micellar slugs desirably used for the recovery of oil are transparent or dispersed liquids containing about 0.1 to 15% by weight of a surfactant in an aqueous medium.

The internal olefin sulfonates (i.e., "IOS") usable as a component (a) of the surfactant in the present invention are those obtained by sulfonating internal olefins containing as a main constituent vinylene-type monoolefin having 10 to 26 carbon atoms, preferably 12 to 24 carbon atoms, and having a general formula:

$$R\text{---CH}=\text{CH---}R'$$

wherein R and R' are independently straight- or branched-chain saturated hydrocarbon groups having 1 or more carbon atoms, provided that the total number of carbon atoms of R and R' is 8 to 24 and optionally containing about 33% by weight (about one-third of the olefins) or less of tri-substituted type monoolefins, followed by neutralizing the sulfonated products with appropriate bases and then, optionally, hydrolyzing the neutralized products. The internal olefin sulfonates thus prepared generally contain about 10% to about 60% by weight of alkenyl sulfonates having a double bond therein and about 90% to about 40% by weight of hydroxyalkane sulfonates, and contain about 80% by weight or more of monosulfonates and about 20% by weight or less of disulfonates. It should be noted, however, that internal olefin sulfonates having compositions different from the above-mentioned percent compositions, which may be prepared by appropriately selecting the sulfonation conditions and hydrolysis conditions, can be used in the present invention.

Generally speaking, the increase in the number of carbon atoms of the internal olefin tends to result in an increase in the percent composition of the alkenylsulfonate. On the other hand, the increase in the mol ratio of the sulfonating agent to the internal olefin during the sulfonation tends to result in an increase in the percent composition of the disulfonate.

The internal olefin sulfonates suitable for use as a component (a) of the surfactant in the present invention are those containing about 40% by weight or more, more preferably about 45% to about 90% by weight, of the hydroxyalkane sulfonates and about 20% by weight or less, more preferably about 0.1% to about 15% by weight, of the disulfonate. When these internal olefin sulfonates are used, micro-emulsions having a sufficiently low interfacial tension can be formed and, therefore, the desired oil recovery efficiency is increased.

The internal olefin sulfonates usable in the present invention can be in the form of alkali metal salts, ammonium salts, and organic amine salts thereof. The preferable counter cations are Na, K, NH4, and alkanolammonium.

Examples of internal olefin sulfonates usable in the formation of the micellar slugs of the present invention are: internal olefin sulfonates having 12, 13, 14, 15, 16, 18, 20, 22, 24, 12 to 16, 13 to 14, 14 to 16, 14 to 18, 15 to 17, 16 to 18, 17 to 20, and 20 to 24 carbon atoms. These sulfonates may be used alone or in any mixture thereof.

The ether sulfonates usable as a component (b) of the surfactant in the present invention are those having the general formula:

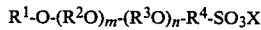

wherein $R^1$, $R^2$, $R^3$, $R^4$, X, m, and n are as defined above. These ether sulfonates can be prepared as follows. That is, alkylene oxides having 2 to 4 carbon atoms, preferably 2 to 3 carbon atoms are addition reacted to alkyl phenols having 12 to 26 carbon atoms, preferably 14 to 24 carbon atoms, or aliphatic alcohols having 8 to 24 carbon atoms, preferably 10 to 20 carbon atoms, to form alkyl phenyl ethers or alkyl ethers. The resultant alkyl phenyl ethers or alkyl ethers are reacted with sodium isethionate, propane sultone, or epichlorohydrin, followed by reacting with sodium sulfite. The alkyl phenols usable for the preparation of the ether sulfonates may have saturated or unsaturated straight- or branched-chain alkyl groups. The aliphatic alcohols may be saturated or unsaturated straight or branched primary or secondary alcohols.

The preferable alkylene oxides usable for the preparation of ether sulfonates are ethylene oxide and propylene oxide. The suitable addition mole number p of the alkylene oxides is about 1 to 20, preferably 1 to 10. The suitable counter cations are alkali metal ions, alkaline earth metal ions, and organic ammonium ions. The preferable counter cations are Na, K, and NH4 ions.

Examples of the ether sulfonates suitable for use in the micellar slug according to the present invention are the ether sulfonates derived from nonylphenol ethoxylates (p=1-10), octylphenol ethoxylates (p=1-10), lauryl alcohol ethoxylates (p=2, 3, 4, 5, 7, and 10), the ethoxylates of synthetic alcohols having 10 to 12 carbon atoms (p=2, 3, 5, 7, and 9), and the ethoxylates of synthetic alcohols having 12 to 14 carbon atoms (p=2, 3, 5, 7, and 9).

As mentioned above, the ether sulfonate is incorporated into the present micellar slug in an amount of 0.1 to 100 parts by weight, preferably 0.5 to 50 parts by weight, based on 100 parts by weight of the above-mentioned internal olefin sulfonate. When too small an amount of the ether sulfonate is used, the formation of the desired micro-emulsions becomes difficult. Contrary to this, when too large an amount of the ether sulfonate is used, the intended effect obtained by the addition of the micellar slug becomes small due to a decrease in the solubilization parameter.

Water or brine having an inorganic salt concentration of 0 to about 20% by weight, preferably about 0.1% to about 15% by weight, can be used as an aqueous medium for the preparation of the micellar slug of the present invention, since the surfactants used in the micellar slug of the present invention have good salinity tolerance and hard-water resistance. The aqueous medium usable in the formation of the micellar slug of the present invention includes soft water, brine, and water in subterranean reservoirs, for example, rain water, river water, lake water, formation water, oil stratum water, and seawater. Typical examples of inorganic salts contained in the brine are NaCl, KCl, Na2SO4, K2SO4, MgCl2, and CaCl2. Examples of divalent metal ions are an Mg ion and Ca ion. These divalent metal ions can be present in an amount of up to about 5000 ppm.

As mentioned above, the present micellar slug suitable for use in the recovery of oil contains, as essential constituents, an internal olefin sulfonate having 10 to 26 carbon atoms and an ether sulfonate having an alkyl or alkenyl phenyl group with 12 to 26 carbon atoms or an alkyl or alkenyl group with 10 to 24 carbon atoms. However, other auxiliary surfactants also can be included in the present micellar slug, taking into consideration the desired interfacial tension between oil and water, the viscosity, the adsorption of the surfactants to the rocks forming subterranean reservoirs, and the cost and availability of the surfactants. Examples of such auxiliary surfactants are anionic surfactants and nonionic surfactants such as petroleum sulfonates, alkylbenzene sulfonates, polyoxyethylene alkylether sulfates, dialkyl sulfosuccinates, alpha-olefin sulfonates, soaps, higher alcohol ethoxylates, alkylphenol ethoxylates, polyol fatty acid esters, fatty acid alkylol amides, and polyoxyethylene fatty acid amides.

When the viscosity of the micellar slugs of the present invention is desired to be controlled, an appropriate known thickening agent such as a watersoluble polymer, lower alcohols, and hydrocarbons can be added to the micellar slugs. Examples of thickening agents usable in the formation of the micellar slugs are heteropolysaccharides produced by microbes, napthalenesulfonic acid-formaldehyde condensates, polyacrylamides, polyacrylates, hydroxyethylcelluloses, and carboxymethylcelluloses. Examples of the lower alcohols optionally used in the present micellar slug are straight or branched alcohols having 1 to 8 carbon atoms. However, since the use of too large an amount of these lower alcohols unpreferably causes a decrease in the oil recovery efficiency, the lower alcohols are preferably used in an amount of 2% by weight or less, if used. Examples of the hydrocarbons optionally used in the present invention are petroleum, liquefied petroleum gas, crude gasoline (naphtha), kerosine, diesel oil, and fuel oil. Recovered petroleum is preferably used due to its low cost and availability as well as its composition, which is identical or similar to that of the oil remaining in the subterranean reservoirs.

According to the present invention, oil can be practically effectively and advantageously recovered from subterranean reservoirs at an extremely high recovery efficiency since the above-mentioned disadvantages of the conventional enhanced oil recovery methods can be effectively eliminated. Thus, when the micellar slug according to the present invention is used, a high oil recovery efficiency can be maintained even if the micro-emulsions are diluted with oil and water in subterranean reservoirs and the intake amounts of oil and water into the microemulsion can be remarkably increased.

The micellar slugs of the present invention can be readily obtained by any known method of production. For example, the incredients including the surfactants and the aqueous medium can be mixed in any order by using conventional mixing devices, mixing temperatures, and mixing pressures.

The recovery of oil from subterranean reservoirs can be carried out, by means of any conventional micellar drive method, by using the micellar slugs of the present invention. For instance, a method by which the micellar slugs are injected under pressure into at least one injection well of the subterranean reservoirs. Then at least one driving fluid, such as flood water and/or an aqueous solution of the above-mentioned thickening agent (i.e., biopolymers such as Xauthan gum, Hydrophillic polymers such as polyacrylamides and polysaccharides, and cellulose derivatives such as carboxymethylcelluloses and hydroxyethylcelluloses), is injected into the injection well so as to transfer to drive the remaining oil toward an oil production well and to recover the oil from the production well. The suitable amount of the micellar slugs injected into the injection well in about 5% to about 200% by volume of the porosity of the subterranean reservoirs, although this is not critical.

EXAMPLES

The present invention now will be further illustrated by, but is by no means limited to, the following Examples, in which the component ratios or amounts of samples used are based on "% by weight" unless otherwise specified.

EXAMPLE 1 AND COMPARATIVE EXAMPLE 1

Aqueous surfactant solutions were prepared by dissolving a 7/3 (by weight) mixture of $C_{15}$–$C_{17}$ IOS-Na and synthetic $C_{12}$–$C_{13}$ alcoholethoxy (p=3) propane sulfonate* as a surfactant component in varying concentration in 1% to 15% sodium chloride aqueous solutions. A 5 ml amount each of the resultant surfactant solutions was mixed with 5 ml of Sarukawa crude oil while stirring at a temperature of 50° C. for 10 minutes. After allowing the mixture to settle, the formation of a micro-emulsion in the mixture is visually observed.

The results are shown in Table 1 in the case where the concentration of the sodium chloride solution was changed from 1% to 15% in each surfactant concentration listed in Table 1.

o ... Formation of the micro-emulsion observed in the middle phase of the mixture.

x ... Formation of the micro-emulsion not observed in the middle phase of the mixture.

As comparative Example 1, the same evaluation test was carried out, except that a 7/3 (by weight) mixture of $C_{15}$–$C_{17}$ IOS-Na and isobutanol was used in lieu of the mixture of $C_{15}$–$C_{17}$ IOS-Na/ether sulfonate.

TABLE 1

| Concentration of Surfactant (%) | Example 1 | Comparative Example 1 |
|---|---|---|
| 5 | o | o |
| 4 | o | o |
| 3 | o | o |
| 2 | o | x |
| 1 | o | x |
| 0.5 | o | x |
| 0.1 | o | x |

*R—O(CH$_2$CH$_2$O)$_3$CH$_2$CH$_2$CH$_2$SO$_3$Na
R = $C_{12}$–$C_{13}$

EXAMPLE 2 AND COMPARATIVE EXAMPLE 2

Mixtures of $C_{18}$–$C_{20}$ IOS-Na and synthetic $C_{12}$–$C_{14}$ branched secondary alcohol ethoxy (p=3) propane sulfonate having varying mixing ratios were charged as a surfactant, together with 5 ml of sodium chloride aqueous solutions having various concentrations and 5 ml of dodecane, into test tubes so that the surfactant concentration became 4%.

The contents of the test tubes were mixed while stirring at a temperature of 50° C. for 10 minutes. After allowing to stand, micro-emulsions were formed. Of these micro-emulsions, the concentrations of the sodium chloride at which the amounts of the n-dodecane and the sodium chloride aqueous solution incorporated into the micro-emulsion of the middle phase became equal to each other was defined as an optimum salinity and the amount of the n-dodecane or the sodium chloride aqueous solution per 1 g of the surfactant at the optimum salt concentration was defined as a solubilization parameter.

The correlations of the optimum salinity and the solubilization parameter vs the mixing ratio of the surfactant are as shown in FIG. 1.

As Comparative Example 2, the same test was carried out, except that a sodium chloride aqueous solution containing 4% $C_{18}$–$C_{20}$ IOS-Na and 2% amyl alcohol was used. The optimum salinity and the solubilization parameter in this case are 1.8% and 8.1 cc/g, respectively.

EXAMPLE 3

A translucent uniform fluid for oil recovery was prepared by mixing, under stirring, 2% of $C_{15}$–$C_{17}$ IOS-Na, 2% of $C_{18}$–$C_{20}$ IOS-Na, 1% of octylphenol ethoxy (P=2) ethane sulfonate, 10% of heptane, and 90% of brine containing 3.6% of sodium chloride, 0.2% of calcium chloride, and 0.01% of magnesium chloride.

The oil recovery test was carried out by using a Berea sandstone core having a length of 28 cm and a diameter of 3.8 cm, and having a permeability of about 200 mD and a porosity of about 20%. A core sufficiently saturated with brine containing 6.2% of sodium chloride, 0.3% of calcium chloride, and 0.1% of magnesium chloride was set in a core holder and then fuel oil was injected under pressure into the core at a feed rate of 6 cc/min until no brine was discharged. Brine was then injected under pressure at the same feed rate in water flooding until the content of the fuel oil in the effluent became less than 0.1%. Thus, the fuel oil was recovered. After the water flooding the core holder and the micellar slug were placed in a constant temperature bath at a temperature of 80° C.

The micellar slug was first injected under pressure into the core in an amount of 10% by volume of the pore volume, a 1% sodium chloride aqueous solution containing (1500 ppm of xanthan gum was then injected under pressure in an amount of 100% by volume of the pore volume and, finally, a 1% sodium chloride aqueous solution was injected under pressure in an amount of 100% by volume of the pore volume. Thus, the fuel oil was recovered. The injection rate under pressure was 1 foot/day.

The oil recovery efficiency was determined by measuring the amount of water in the core after the test in a toluene azeotropic method to convert the recovered amount of the fuel oil. As a result, it was found that 93% of the oil was recovered.

EXAMPLE 4

A transparent micellar slug for oil recovery was prepared by mixing, under stirring, 3% of $C_{15}$–$C_{17}$ IOS-Na, 3% of octylphenol ethoxy (p=7) propane sulfonate, and 94% of brine containing 10.4% of sodium chloride, 1.3% of calcium chloride, and 0.2% of magnesium chloride.

The oil recovery test was carried out in the same manner as in Example 3 by using the micellar slug for oil recovery obtained above at a temperature of 50° C., except that the brine used in the preparation of the micellar slug for oil recovery was also used as the brine injected into the core and the preparation of the polymer solution.

The oil recovery efficiency in this test was 89%.

EXAMPLE 5

A translucent micellar slug for oil recovery was prepared by mixing, under stirring, 0.9% of $C_{15}$–$C_{17}$ IOS-Na, 3.5% of $C_{18}$–$C_{20}$ IOS-Na, 0.6% of $C_{12}$–$C_{14}$ branched secondary alcohol ethoxy (p=3) hydroxypropane sulfonate, 4% of n-dodecane, and 91% of brine containing 2.2% of sodium chloride, 0.49% of calcium chloride, and 0.1% of magnesium chloride.

The oil recovery test was carried out in the same manner as in Example 3 at a temperature of 50° C. by using the micellar slug for oil recovery obtained above. In this test a brine composition was 4.56% of sodium chloride, 1% of calcium chloride, and 0.21% of magnesium chloride, the salinity of the polymer solution was 1% of sodium chloride, the salinity of the final brine was 0.5% of sodium chloride, and n-dodecane was used as the hydrocarbon.

The oil recovery efficiency in this test was 91%.

We claim:

1. A micellar slug for use in the recovery of oil, consisting essentially of a surfactant and an aqueous medium, which may contain an inorganic salt, said surfactant contaqining, as essential constituents,
    (a) at least one internal olefin sulfonate having 10 to 26 carbon atoms; and
    (b) 0.1 to 100 parts by weight, based on 100 parts by weight of said internal olefin sulfonatae, of at least one ether sulfonate having the general formula:

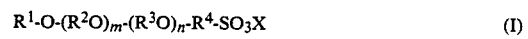

$$R^1\text{-O-}(R^2O)_m\text{-}(R^3O)_n\text{-}R^4\text{-SO}_3X \qquad (I)$$

wherein $R^1$ represents an alkyl or alkenyl phenyl group having 12 to 26 carbon atoms or an alkyl or alkenyl group having 10 to 24 carbon atoms, $R^2$ represents $C_2H_4$ or $C_3H_6$, $R^3$ represents $C_2H_4$ or $C_3H_6$, $R^4$ represent $C_2H_4$, $C_3H_6$, or $CH_2CH(OH)CH_2$, $n>0$, $m>0$, and $n+m=0$ to 15, and X represents an alkali metal or an alkaline earth metal;
    said micellar slug containing no lower alcohol as a cosurfactant.

2. A micellar slug as claimed in claim 1, wherein the concentration of said surfactant in the micellar slug is 0.1 to 15% by weight.

3. A micellar slug as claimed in claim 1, wherein the carbon number of said internal olefin sulfonate is 12 to 24.

4. A process for produceing oil from an oil-bearing subterranean reservoir penetrated by wells, which comprises the steps of:
    (1) injecting into said reservoir through an injection well a micellar slug consisting essentially of a surfactant and an aqueous medium, whihc may contain an inorganic salt, said surfactant containing, as essential constituents,
        (a) at least one internal olefin sulfonate having 10 to 26 carbon atoms; and
        (b) 0.1 to 100 parts by weight, based on 100 parts by weight of said internal olefin sulfonate, of at least one ether sulfonate having the general formula:

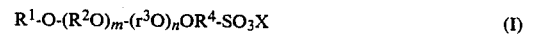

$$R^1\text{-O-}(R^2O)_m\text{-}(r^3O)_n oR^4\text{-SO}_3X \qquad (I)$$

wherein $R^1$ represents an alkyl or alkenyl phenyl g roup having 12 to 26 carbon atoms or an alkyl or alkenyl group having 10 to 24 carbon atoms, R $R^2$ represents $C_2H_4$ or $C_3H_6$ , $R^3$ $C_2H_4$ or $C_3H_6$, $R^4$ represent $C_2H_4$, $C_3H_6$, or $CH_2CH(OH)CH_2$, $n>0$, $m>0$, and $n+m=0$ to 15, and X represents an alkali metal or an alkaline earth metal;
        said micellar slug containing no lower alcohol as a cosurfactant;
    (2) injecting into said reservoir at least one driving fluid; and
    (3) recovering oil from said reservoir through a production well.

* * * * *